May 30, 1967  E. C. McRAE  3,322,040

TRACTOR HYDRAULIC SYSTEM

Filed April 23, 1965  2 Sheets-Sheet 1

INVENTOR.
Edwin C. McRae

BY

May 30, 1967        E. C. McRAE        3,322,040
TRACTOR HYDRAULIC SYSTEM
Filed April 23, 1965        2 Sheets-Sheet 2

INVENTOR.
Edwin C. McRae
BY

United States Patent Office 3,322,040
Patented May 30, 1967

3,322,040
TRACTOR HYDRAULIC SYSTEM
Edwin C. McRae, Rte. 1, Cusseta, Ala. 36852
Filed Apr. 23, 1965, Ser. No. 450,307
7 Claims. (Cl. 91—447)

This application is intended to disclose an improved valve for use with tractors having the hydraulic control mechanism shown in my United States Patent 2,631,515.

In the above mentioned patent the hydraulic system is regulated by controlling the inlet to the hydraulic pump. This has the disadvantage that remote cylinders may not be conveniently operated by the tractor pump.

In the system about to be disclosed the tractor pump is operated at full capacity all the time the tractor engine is being run and my improved valve controls the output of the pump to raise or lower the implement according to the desire of the operator.

With my improved valve the implement may be raised very slowly, regardless of the speed of the pump, or it may be raised as fast as the pump output will allow.

My improved valve has the further advantage in that it has a positive cut off at any ram position selected by the operator and the output of the pump is returned to zero pressure as soon as the implement has been raised to this predetermined height.

With all tractor hydraulic systems having positive displacement pumps it has been necessary to provide a servo valve to shift the pump flow to the sump after the lift has been completed. Such servo valves, while satisfactory to raise or lower the implement, have the disadvantage that they are either on or off. They cannot regulate or control the speed at which the implement is being raised.

With my improved valve the implement may be raised very slowly and still provide the positive cut off that a servo valve provides.

A further object of my invention is to provide a valve by which the tractor implement may be raised at normal speed but which starts the lift at a slow speed and stops the lift at a slow speed so that the implement is started and stopped at a slow rate to thereby prevent the jerk that results from using the conventional servo valve. This feature is of particular advantage when the valve is controlled by the draft on the implement. Much smoother operation results when the implement is gradually raised from the ground than results when it is jerked upwardly at full pump speed. The implement must of course, be accelerated to a predetermined lift speed but when it is started at a slow rate much smoother operation results.

Still a further object of this invention is to provide a valve wherein the corrections necessary to compensate for leak down in the valve and ram cylinder are accomplished very smoothly. With all servo valves leak down in the ram cylinder requires the intermittent application of the servo valve to bring the implement up to its predetermined height. When a servo valve is used to provide such corrections the implement is raised with a jerk. With my improved valve the implement is raised so slowly that no jerk is noticeable.

With these and other objects in view, my invention consists in the arrangement, construction and combination of the various parts comprising this invention, as shown in the accompanying drawings, in which.

Figure 1:
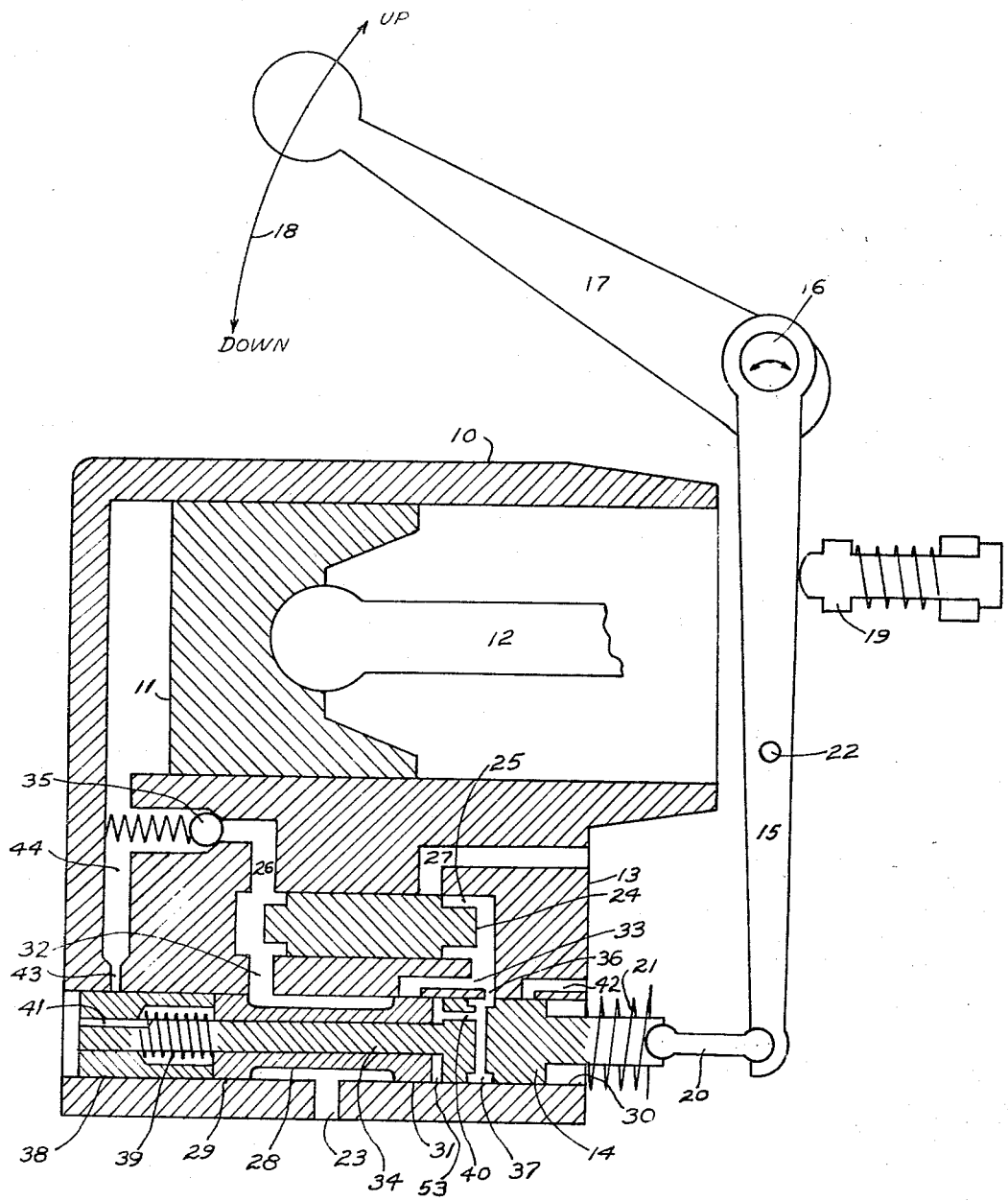
FIG. 1 shows a schematic diagram in section of a hydraulic system which incorporates my invention.

In FIG. 1 numeral 10 designates a ram cylinder having a piston 11 reciprocally mounted therein. The piston 11 pushes a link 12 which operates a lift arm, not shown, to raise an implement associated with a tractor. When the piston 11 moves outwardly in the cylinder 10 the implement is raised and when the cylinder 10 is vented the weight of the implement forces the piston inwardly.

A valve housing 13 is associated with the cylinder 10 and a control valve 14 is reciprocally mounted in a suitable bore 30 in the housing 13. A control arm 15 is pivotally mounted upon an eccentric shaft 16, which shaft is moved forward and back by a manually operated lever 17. When the lever 17 is moved downwardly, as shown by arrow 18, the upper end of the arm 15 is moved to the left and when the lever 17 is pulled upwardly this upper end of arm 15 is moved to the right.

A spring supported fulcrum 19 is associated with the tractor lift mechanism and a link 20 connects the free end of the control arm 15 with the valve 14. The fulcrum 19 may be actuated by the lift mechanism or it may be actuated by a draft control mechanism. This is explained more fully in my above identified patent but for the purpose of this application it may be considered that fulcrum 19 is stationary. A compression spring 21 urges the valve 14 to the right from that shown in the drawings so that the arm 15 is urged against the fulcrum 19.

A pin 22 is fixed in the arm 15 in position such that the piston 11 strikes the pin 22 just before the piston reaches the end of its stroke. Further movement of the piston 11 swings the arm 15 around the shaft 16 to thereby compress the spring supported fulcrum 19 and allow the valve 14 to be moved by spring 21 to the right. The piston 11 thus moves the valve 14 to shut itself off at the outer end of its stroke.

When the lever 17 is moved downwardly in the direction of arrow 18, the upper end of arm 15 is pivoted around the fulcrum 19 so that spring 21 moves the lower end of arm 15 to the right. Conversely, when the lever 17 is raised the arm 15 is moved around the fulcrum 19 so that its lower end moves to the left.

The above described mechanism is essentially that shown in the above identified patent and forms no part of my invention. It is described herein only to illustrate the working of my improved valve mechanism.

My valve mechanism comprises a flutter valve 24 which is reciprocally mounted in a suitable bore 25 in the housing 13. The flutter valve 24 is adapted to reciprocate back and forth in the bore 25 and functions to divide the flow of oil from the tractor pump to a ram port 26 and a sump port 27, according to the position of the control valve 14.

The ram port 26 is connected to the ram cylinder 10 thru a check valve 35 which allows the fluid in port 26 to flow into the ram cylinder but which prevents pressure in the cylinder from forcing the fluid back into the ram port when the pressure therein drops below that in the ram cylinder. Such check valve is necessary because the valve 24 is caused to reciprocate due to a difference in pressures at the respective ends of the valve 24. The pressure differential is caused by a drop in pressure in the ram port 26 below the pressure at the other end of valve 24. When the sump port 27 is open oil flows thru this port which causes the pressure on the adjacent end of valve 24 to drop below that in ram port 26. The pressure differential is due solely to the throttling effect of the control valve.

Flutter valves somewhat similar in principle to the valve 24 have previously been used in hydraulic systems but only to divide the flow from a pump to two ram cylinders. Such valves have invariably been provided with fixed orifices so that both ram cylinders receive the same volume of oil regardless of the load on the individual ram pistons.

In my improved control system the flow of oil from the tractor pump is divided between a ram cylinder and the tractor sump, according to the position of the control valve. This valve may be adjusted to direct all of the fluid to flow to the ram cylinder or direct all of the fluid to flow to the sump. In its intermediate position half of the fluid is forced into the ram cylinder while half is directed to the sump. In fact any desired ratio of fluid to the ram and to the sump is attainable by shifting the control valve. This feature is what distinguishes applicant's control valve from other systems which employ flutter valves.

A further characteristic of my improved system is that movement of the piston 11 may be used to shut off the flow of oil and divert the oil from the tractor pump to the tractor sump. This is accomplished without the valve "hanging up" as would be the case if a simple on and off valve were used to regulate the flow of oil from a tractor operated pump.

In tractor hydraulic systems it is either necessary to provide a variable displacement pump or to provide means whereby the output of a consistent displacement pump is directed to the tractor sump when the lift piston has reached a predetermined point. This requires that movement of the lift piston must actuate the control valve to not only shut off the flow of oil from the tractor pump but also to return the pump to zero pressure. This is the objective which in the past has been difficult to attain.

In the past it has been possible to obtain this objective only by the use of a servo valve. While my improved valve may be classified as a servo valve it functions in connection with the flutter valve 24 to not only vary the rate of lift of the ram piston but also to permit movement of the ram piston to shut off the flow of oil from the tractor pump and divert such flow to the tractor sump.

Before describing the means whereby applicant's control valve is prevented from "hanging up" when it is actuated by movement of the ram piston it may be well to explain how the flow of oil from the tractor operated pump is divided between the ram cylinder and tractor sump to thereby vary the speed of the ram piston independently of the speed of the tractor pump.

An inlet port 23 extends thru the housing 13 into the bore 30. The port 23 is connected at all times to the outlet of a tractor operated hydraulic pump. A spool valve 28 is reciprocally mounted in the bore 30, this spool having a land 29 on one end and a land 31 on the other end with its center portion reduced so as to admit oil from the inlet port 23 to each of these lands. A ram passageway 32 connects with the ram port 26 and intersects the bore 30 adjacent to land 29. A sump passageway 33 intersects the bore 30 adjacent to land 31. The passageway 33 extends to the end of the bore 25 adjacent to sump port 27. When the valve 24 is moved to the right the sump port 27 is cut off from the passageway 33 and when the valve 24 is moved to the right passageway 33 is connected to the sump port 27.

In the conventional flutter valve installation both ports 26 and 27 would be offset inwardly from passageways 32 and 33. However, since the applicant's port 27 leads only to the sump it is not necessary that the valve 24 cut off the flow of oil to the ram port 26. The resistance in the ram cylinder is sufficient to build up the pressure necessary to move the valve 24 to cut off the flow of oil to the sump.

The lands 29 and 31 are so positioned that when passageway 32 is unobstructed passageway 33 is closed by land 31. Conversely, when passageway 33 is unobstructed passageway 32 is closed by land 29. In an intermediate position of valve 28 the passageways 32 and 33 are each only half unobstructed. The flutter valve 24 reciprocates back and forth at a high rate of speed to intermittently open and close the sump port 27 depending upon the flow of fluid thru the passageways 32 and 33. When port 27 is closed pressure builds up in passageway 32 as all of the oil is at such time flowing thru passageway 32 into the ram port 26. This causes a pressure drop at the left hand end of valve 24 so that it moves to the left to open port 27. The full volume of oil then flows thru port 27 to cause a pressure drop in passageway 33. The oil in passageway 32 is now static so that the valve 24 is immediately moved to the right to close sump port 27.

This cycle of operation is repeated at high frequency depending upon the inertia of the valve 24 and continues as long as pressure is applied to the inlet port 23 and the passageways 32 and 33 are both unobstructed. The amount of oil which flows to the ram and to the sump depends only upon the relative openings provided by the passageways 32 and 33 and is independent of the pressure necessary to move the ram piston. It is by varying the position of the spool valve 28 that the applicant is able to vary the speed of the ram piston independently of the speed at which the tractor pump is being operated.

The spool valve 28 is reciprocally mounted upon a reduced stem portion 34 of the control valve 14 and is reciprocated by the valve 14. If the valve 28 were fixed on the stem 34 outward movement of the ram piston 11 would actuate the pin 22 to move the arm 15 and valve 14 to the right until the spool valve 28 just closed the passageway 32. All of the oil from the pump would then be flowing to the sump but the pressure on the left hand end of the valve 24 would be equal to the ram pressure and the valve would "hang up."

To prevent the valve 28 from "hanging up" means have been provided for moving this valve to the right by the valve 14 only so far that it still leaves passageway 32 slightly open. In this position the flow of oil thru the passageway 32 is still sufficient to move the piston 11 but at a very slow rate. At this point other means are provided for fully closing the passageway 32 by the valve 28 independently of movement of the piston 11.

The passageway 33 is provied with a port 36 which intersects the bore 30. The valve 14 is provided with an annular channel 37 which is aligned with the port 36 in all positions of the valve 14 where lift is desired. A let down valve 38 is fixed to the left hand end of the stem 34 and a compression spring 39 extends between the valve 38 and valve 28 to urge the valve 28 to the right at all times. A passageway 40 extends from the channel 37 to the reduced portion of the valve 14. Fluid pressure applied to the channel 37 thus moves the spool valve 28 against the force of the spring 39 to position against the let down valve 38. The left hand end of the spool valve 28 is open to the atmosphere by means of a groove 41 which is machined in the stem 34. An exhaust port 42 intersects the bore 30 in position spaced from the port 36 and channel 37 is of sufficient length that it almost but not quite bridges the distance between the ports 36 and 42. Clearance 53 is provided between the valve 14 and valve 38 so that the valve 28 may move about 1/16 inch on the stem 34.

Figure 2:
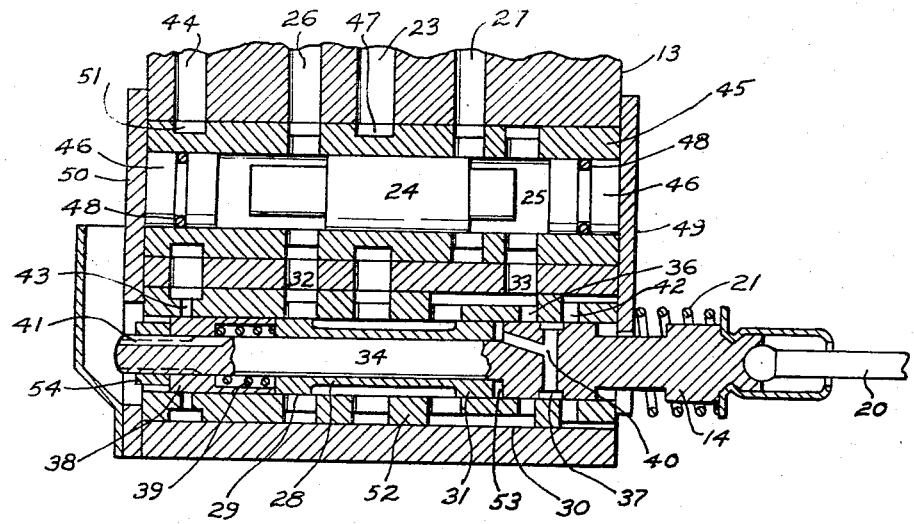
FIG. 2 is a central sectional view thru the control valve, shown in FIG. 1.

When the valve 14 is in the position shown in FIG. 1 practically all of the fluid is being directed to the ram cylinder 10 as the sump port 27 is closed by the flutter valve 24 and passageway 33 is closed by land 31. However, leakage by the land 31 maintains ram pressure in the passageway 33 to thereby maintain the spool valve 28 in the position shown. As the control valve 14 is moved to the right, either by the manually operated lever 17 or the piston 11, the valve 14 assumes the position as shown in FIG. 2. In this position the channel 37 is cut off from the port 36 and is about to move into alignment with the port 42. The ram piston 11 is still moving because the land 29 has not yet fully covered the passageway 32. However, oil pressure is not, in this position, being applied to the passageway 40 but as the oil is trapped in this passageway the valve 28 cannot be moved by the spring 39 to the position shown in FIG. 3. The valve 14 continues to move to the right as long as the piston 11 continues to move outwardly and after about .005 inch of movement the channel 37 comes in contact with the exhaust port 42. The passageway 40 is thereby vented to the atmosphere and spring 39 moves the spool valve 28 to the right until it fully closes the passageway 32 and takes up the clearance 53. The land 29 is just long enough to cover the passageway 32 in this position but leakage is permitted around land 29 to thereby reduce the pressure in passageway 32 to atmosphere. The flutter valve 24 is then forced to the left by the oil flowing thru the passageway 33 to fully uncover the sump port 27.

The above described action is independent of movement of the piston 11 so that the oil from the pump is directed to the sump and the spool valve 28 is prevented from "hanging up."

When leakage around the piston 11 or thru the check valve 35 causes the implement to drift down the valve 14 is moved to the left until channel 37 is out of communication with exhaust port 42 and is in communication with port 36. Leakage around land 29 is thus stopped so that pressure starts to build up in passageway 32. This forces valve 24 to the right to restrict the flow of oil thru the sump port 27 and build up pressure in passageway 33. When this pressure gets up to 25 or 50 p.s.i. the force on the right hand end of the spool valve 28 is sufficient to overcome the pressure of spring 39 so that valve 28 starts to move to the left on stem 34. This action, as it starts to uncover passageway 32, causes the pressure in the system to immediately build up to ram pressure. The spool valve 28 is thus forced to its full position against the let down valve 38 where passageway 32 is open enough to definitely supply fluid to the ram cylinder 10 but at a rate of only 5 or 10 percent of the full rate available from the tractor pump. In this way a correction to overcome drift down of the implement is made without the valve "hanging up." As the position of the land 29 relative to passageway 32 is critical an adjusting nut 54 is provided on the end of stem 34 to adjust the clearance 53.

In order that the ram cylinder 10 can be manually vented to let down the implement I have provided a port 43 which communicates with the bore 30 adjacent to the let down valve 38. The port 43 is connected to the ram cylinder 10 by a line 44. When it is desired to lower the implement the valve 14 is moved still further to the right from the position shown in FIG. 3 until port 43 is uncovered by valve 38. Oil from the ram cylinder is thus exhausted until the implement rests on the ground or the valve 38 is moved to the left to close the port 43.

Figure 3:
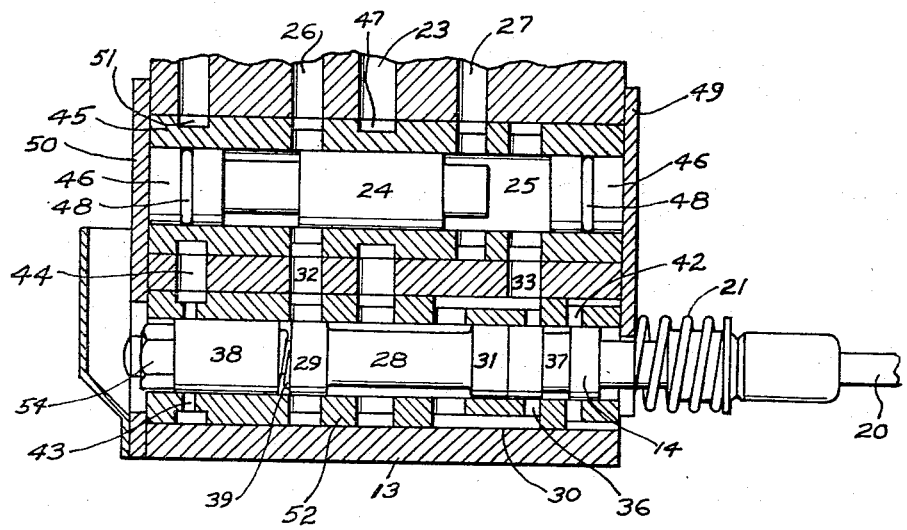
FIG. 3 is a view, similar to FIG. 2 but with the control valve in another position.

While FIG. 1 has been shown diagrammically to easier understand the operation of the device it will be apparent the the valves shown therein are not balanced and that under pressure the valve 14 could not be moved by the spring 21. FIGS. 2 and 3 show the construction whereby these valves are balanced so that regardless of the fluid pressure in the system the valves 14, 28, 38 and 24 are hydraulically balanced so that they may be readily moved axially regardless of the pressure in the system.

To accomplish this a sleeve 45 is pressed into the bore 25 and valve 24 reciprocates in this sleeve. Plugs 46 are inserted into the ends of the sleeve 45. The ram port 26, sump port 27, passageways 32 and 33 communicate with the bore in the sleeve 45 thru diametrically spaced openings or slots to thereby apply pressure equally on both sides of the valve 24. For convenience inlet port 23 and line 44 enter the bore 30 thru annular grooves 47 and 51 respectively in the exterior of sleeve 45 but do not otherwise communicate with the bore in this sleeve. Neoprene O rings 48 seal the plugs 46 in the sleeve 45 and cover plates 49 and 50, respectively prevent the plugs 46 from being forced by hydraulic pressure from the sleeve 45.

In like manner a sleeve 52 is inserted in the bore 30 and valves 14, 28 and 38 reciprocate in the sleeve 52. These sleeves are provided mainly to balance the valves but are preferably made of steel and hardened to co-operate with hardened valves thus providing long life for the system.

Among the several advantages of my improved hydraulic system are that:

The rate of lift of the implement is controlled so that the implement starts to lift at a low rate and completes its lift at such low rate. This is accomplished irrespective of the normal rate of lift provided by the tractor pump. This is of particular importance with draft controlled implements where the implement is normally lifted only a fraction of an inch to reduce the draft on the tractor. Full rate of lift is provided when an obstruction is encountered or when it is desired to lift the implement rapidly, as at the end of a furrow when plowing.

A further advantage is that the control valve is prevented from "hanging up" when it is actuated by movement of the ram piston.

Some changes may be made in the arrangement and design of my improved hydraulic system without departing from the scope of my invention to cover by my claims such changes as may reasonably be included within the scope thereof.

I claim as my invention:

1. In a hydraulic system for controlling the flow of fluid from a fluid source to a ram cylinder, a valve housing having a valve bore therein and having a ram passageway leading from said bore to said ram cylinder, said housing also having a sump passageway therein leading from said bore to a fluid sump, and said housing having an inlet port therein which conducts fluid from said fluid source to said bore, a cylindrical valve reciprocally mounted in said bore which in a no lift position conducts fluid from said inlet port to said sump passageway and closes said ram passageway to said inlet port, and in a fast lift position closes said sump passageway and opens said ram passageway to said inlet port, and in a slow lift position leaves both said sump and ram passageways open to said inlet port, said housing also having a flutter valve bore therein the ends of which are closed, said ram passageway communicating with one end of said flutter valve bore and said sump passageway communicating with the other end of said flutter valve bore, a flutter valve reciprocally mounted in said flutter valve bore, said flutter valve being urged in one direction by fluid pressure in said ram passageway to a positon where it closes said sump passageway and being urged in the opposite direction by fluid pressure in said sump passageway to a position where said sump passageway becomes unobstructed, said flutter valve rapidly reciprocating to divide the flow of fluid from said fluid source to said ram cylinder and sump, respectively, when said cylindrical valve is in a slow lift position, a control valve reciprocally mounted in said housing, said control valve being operated to move said cylindrical valve back and forth between its fast lift position and its no lift position, means for constantly urging said cylindrical valve in one direction relative to said control valve, said control valve having valve means associated therewith which in one position of said control valve conducts fluid from said fluid source to one end of said cylindrical valve to overcome the means for constantly urging said cylindrical valve and thereby move said cylindrical valve in an opposite direction independently of movement of said control valve, said valve means in another position of said control valve exhausting fluid from adjacent to said cylindrical valve to thereby permit said means for constantly urging said cylindrical valve to move said cylindrical valve independently of movement of said control valve.

2. A device, as claimed in claim 1, wherein the valve means associated with said control valve for conducting and exhausting fluid from one end of said cylindrical valve becomes operative to permit said cylindrical valve to move from its slow lift position to its no lift position.

3. A device, as claimed in claim 1, wherein said cylindrical valve and said control valve are mounted concentrically in said housing.

4. A device, as claimed in claim 1, wheerin said cylindrical valve when in its no lift position opens said ram passageway to the atmosphere to thereby permit said flutter valve to move to a position where it leaves said sump passageway unobstructed.

5. A device, as claimed in claim 1, wherein said means for constantly urging said cylindrical valve relative to said control valve comprises a compression spring interposed between said control valve and said cylindrical valve.

6. A device, as claimed in claim 1, wherein said valve means associated with said control valve comprises an annular groove formed therein which co-operates with a port leading from said sump passageway, said groove being in constant communication with the adjacent end of said cylindrical valve.

7. A device, as claimed in claim 1, wherein said valve means associated with said control valve comprises an annular groove formed therein and which groove is in constant communication with the adjacent end of said cylindrical valve, said groove being moved by said control valve from a position wherein it is aligned with a port from said sump passageway to a position where said sump port is cut off and it is aligned with a port leading to the atmosphere, for the purpose described.

References Cited
UNITED STATES PATENTS

| | | | |
|---|---|---|---|
| 2,716,966 | 9/1955 | Hubert et al. | 91—384 |
| 2,799,251 | 7/1957 | Newgen | 91—384 |
| 2,847,030 | 8/1958 | McRae | 137—596.13 |
| 2,877,743 | 3/1959 | Laaen | 91—390 |
| 3,088,283 | 5/1963 | Fuvia et al. | 91—384 |
| 3,103,147 | 7/1963 | Peras | 91—384 |

MARTIN P. SCHWADRON, *Primary Examiner.*

PAUL E. MASLOUSKY, *Examiner.*